June 24, 1958 B. H. BROWALL 2,840,428
PACKING FOR PISTONS

Filed June 4, 1956 2 Sheets-Sheet 1

INVENTOR.
BERT H. BROWALL
BY
Wenderoth, Lind & Ponack
Attys.

June 24, 1958     B. H. BROWALL     2,840,428
PACKING FOR PISTONS
Filed June 4, 1956                                      2 Sheets-Sheet 2
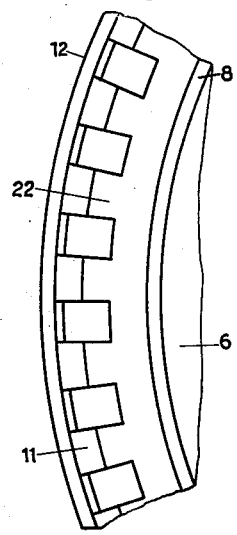
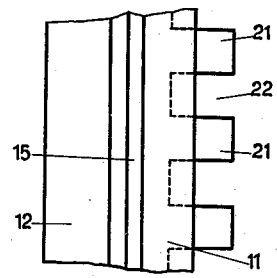
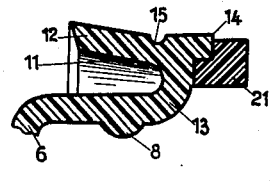
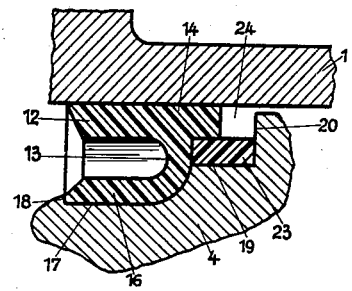
INVENTOR.
BERT H. BROWALL
BY
Attys.

United States Patent Office

2,840,428
Patented June 24, 1958

2,840,428

PACKING FOR PISTONS

Bert Henry Browall, Malmo, Sweden, assignor to Technica Establishment, Vaduz, Principality of Liechtenstein Application June 4, 1956, Serial No. 589,266

9 Claims. (Cl. 309—23)

This invention relates to packings for pistons operating in cylinders such as the brake cylinders of fluid pressure brakes for railway and like vehicles. More particularly the invention relates to a combination of the kind comprising a cylinder, a piston operating in the cylinder and having a pressure side and a nonpressure side, and a packing for said piston, which packing is of elastic, resilient material and comprises an annular portion engaging the piston for retaining the packing thereon, a peripheral flange forming a sealing lip in contact with the wall of the cylinder, and a portion extending substantially in a plane at right angles to the axis of the cylinder and the piston therein and joining the peripheral flange and the annular retaining portion of the packing. A combination of this kind is disclosed in the U. S. Patent No. 2,055,104, granted September 22, 1936, to Ellis E. Hewitt. But the present invention may be useful also in any other combination of the kind referred to in the foregoing.

The object of the invention is to improve the performance of the piston packing as will be explained in the following description of preferred forms of the invention as applied to a combination including a packing as disclosed in German Patent 615,497 or in Austrian Patent 184,008 in addition to certain features of the construction illustrated in Figs. 5 to 7 in the U. S. Patent No. 2,055,104 above referred to. In the following description reference is had to the accompanying drawing in which:

Fig. 2 is a fragmentary view of the non-pressure face of the rubber packing for the piston shown in Fig. 1;

Fig. 3 is a fragmentary side view of the piston packing shown in Figs. 1 and 2;

Fig. 4 is a longitudinal sectional view through the peripheral sealing lip and adjacent portions of a modified packing for the piston shown in Figs. 1 and 2;

Fig. 5 illustrates a second modified construction of the piston and packing device embodying another form of the invention and is a longitudinal sectional view through a portion of the piston and the packing thereon and the adjacent portion of the cylinder wall.

Figure 1:
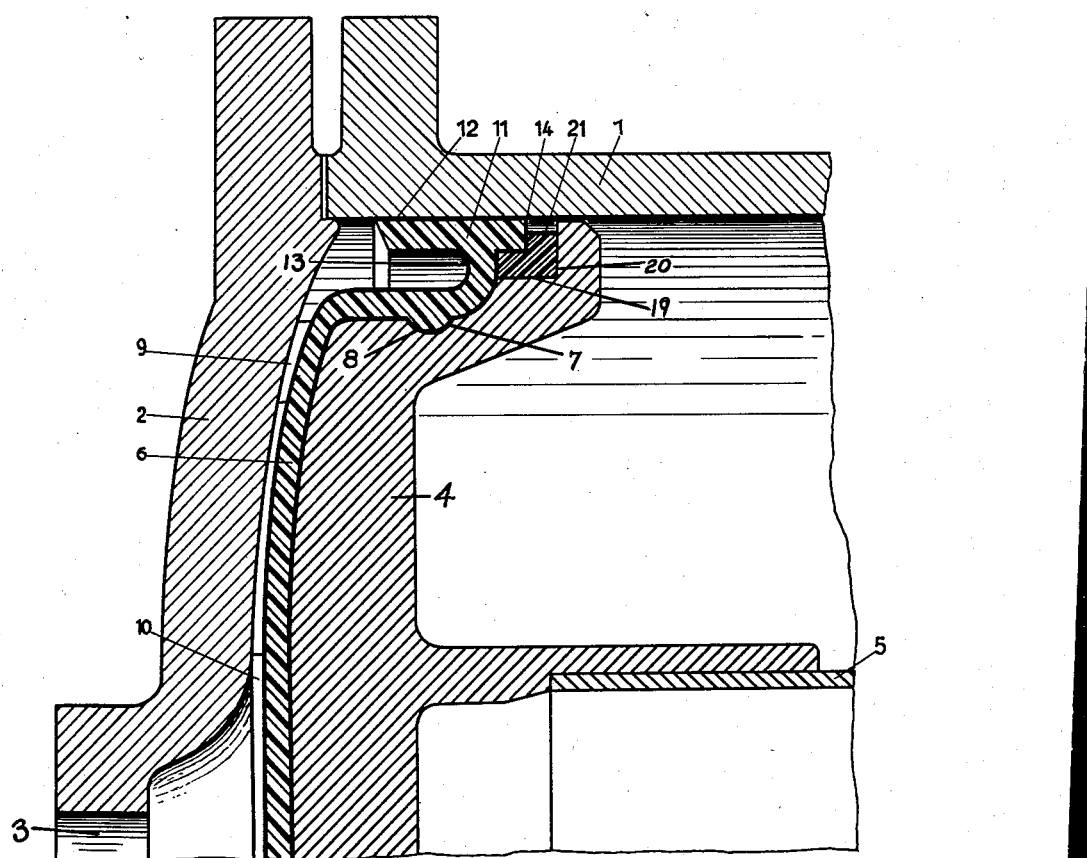
Fig. 1 is a longitudinal sectional view through a portion of a brake cylinder and piston device embodying one form of the invention.

Referring to the drawings and particularly to Fig. 1, the device illustrated therein comprises a brake cylinder 1 provided with the pressure head 2 having an opening 3 which receives the brake cylinder pipe or a fitting therefor (not shown). The piston 4 operating in the brake cylinder is equipped with the usual sleeve 5 for receiving the usual push rod (not shown) which is connected to the levers and rods of the foundation brake rigging when installed on a railway car. The brake cylinder and piston and their accessories, except novel features of or in connection with the packing for the pison, can be taken as being of a well-known standard construction already in wide use.

The piston packing illustrated in Fig. 1 comprises a central portion or cup 6 of the now conventional "snap-on" type which completely covers the pressure face of the piston 4 whose circumference is machined so as to provide an annular groove 7 into which an annular bead 8 on the inside of the circumferential wall of the packing cup is snapped. This method of retaining the packing in place on the piston is standard. Standard is also the provision of spaced lugs or ribs 9 and 10 on the face of the cup facing the pressure head 2 to permit compressed air entering the cylinder through the opening 3 to act immediately on the pressure face of the packing substantially throughout its entire area. In these respects reference may be had to the aforesaid U. S. Patent No. 2,055,104 and particularly to Figs. 5, 6 and 7 thereof. The packing has a peripheral flange 11 forming a sealing lip 12 in contact with the wall of the cylinder 1.

This peripheral flange 11 and the cup 6 are integrally joined by a more or less flange-like portion 13 of the packing, which extends outwardly from the cup 6 substantially in a plane perpendicular to the longitudinal axis of the cylinder and piston device. The pressure face of the circumferential wall of the cup 6, the peripheral flange 11 and the integrally joining portion 13 of the packing preferably may form a U-bend more or less similar to that of the present standard construction of piston packings of the kind herein concerned.

The peripheral flange 11 constituting the sealing lip 12 may be of the same construction as the peripheral flange or fold 18 in the aforementioned U. S. Patent No. 2,055,104, in which said flange or fold is normally flared outwardly so that when the packing is mounted in place on the piston and inserted within the cylinder, the said flange or fold is forced substantially throughout its entire axial length into contact with the wall of the cylinder by the tendency of the elastic, resilient material of the packing to return to its original shape. However the peripheral flange 11 may be of any other suitable construction, for example conforming to German Patent 615,497 as shown in Fig. 1 or conforming to Austrian Patent 184,008 as shown in Fig. 4. Both constructions are provided with an extension 14, extending from the peripheral flange 11 beyond the flange-like portion 13 towards the non-pressure face of the piston 4. This extension 14 is shown in Figs. 1, 4 and 5. The packing conforming to Austrian Patent 184,008 is adapted with a grease groove 15 shown in Fig. 4.

The material of the piston packing preferably may be a rather soft synthetic rubber composition which is resistant to the brake cylinder lubricant to be used and which maintains its softness, flexibility and resiliency even at rather low temperatures. Reinforcing fabric embedded in the rubber has been found unnecessary but may be used if desired as an aid in imparting the desired properties to the packing.

In Fig. 5 there is also shown a modified form of that portion of the packing which serves the purpose of retaining it in place on the piston 4 and with which the peripheral flange 11 of the packing is integrally united by the flange-like portion 13 of the packing. As shown in Fig. 5, the retaining portion 16 of the packing is in the shape of a ring for which there is provided in the peripheral portion of the piston 4 a shallow annular groove 17 providing on the piston a shoulder 18 over which the packing ring is expanded and snapped into place. It is to be noted, however, that the construction of the retaining portion of the packing forms no part of this invention and may be varied as desired.

In a widely used construction (the Westinghouse type AB brake cylinder) of the brake cylinder and piston device of fluid pressure brake equipment, using as standard a piston packing cup of the kind described in the aforementioned U. S. Patent No. 2,055,104, there is also used as standard and as a remedy for maintaining the lubrication of the cylinder wall against the wiping-off effect of the sealing lip of the conventional type of packing cup, a steel stamping in the form of a ring with a cross-section in the shape of a U-bend with its opening facing outwards, towards the cylinder wall. This steel stamping is placed in an annular recess in the piston, on the non-pressure side of the packing, and one of the walls of the U-bend of the steel stamping is curved to form a support for the facing U-bend of the packing which, because of the said recess in the piston, otherwise would have no support. In a separate ring within the U-bend of the steel stamping is held a felt swab. These features, although not described in the cited U. S. Patent No. 2,055,104, are clearly illustrated in Fig. 7 thereof immediately to the left of the U-bend of the packing cup. The free space left within the U-bend of the steel stamping forms a groove which is intended to be filled with cylinder wall lubricant with which also the felt swab is intended to be saturated for the purpose that from this supply of lubricant with each stroke of the piston in the cylinder a new film of grease should be spread over the cylinder wall in replacement of the grease wiped off.

The standard construction of the piston and packing device just recited does not permit the packing cup thereof to be directly replaced by a packing cup as disclosed by German Patent 615,497 or Austrian Patent 184,008 without any other change, because the extension 14 of the flange 11 calls for an additional axial space, namely a part of the space occupied by the aforesaid steel stamping of the standard construction.

The present invention provides a practical and good solution of the problem of making a packing cup constructed in accordance with German Patent 615,497 or Austrian Patent 184,008 easy to mount on the piston of the hereinbefore recited standard construction in replacement of the standard packing cup thereof. This is obtained by entirely dispensing with the steel stamping and the felt swab of the standard piston and packing device and making other use of the recess provided for them in the circumference of the piston. In Figs. 1 and 5 the cylindrical bottom and the end wall of said recess are denoted with the numerals 19 and 20, respectively. The extension 14 of the flange 11 is allowed to project into said recess. The rest of the said recess in the piston is only partially occupied by a resilient cushion disposed in spaced relation to the wall of the cylinder 1 and yieldingly backing up the extension 14 of the flange 11 and that portion of the flange 13 which projects radially outwards beyond the cylindrical bottom 19 of the recess. The remainder of the recess thus not filled up constitutes a continuous space or series of intercommunicating spaces and all these spaces are intended to be filled with cylinder wall lubricant. As shown in Figs. 1 to 4, the said cushion forms an axial extension of the packing at the non-pressure side thereof for resiliently supporting the peripheral flange 11 and the joining flange 13 axially from the remote end wall 20 of the recess in the piston. The cushion may consist of one or more axially resilient spacers between the non-pressure end of the peripheral flange 11 and joining flange 13 and the end wall 20, and these spacers may consist of peripherally interspaced protuberances 21 moulded integrally with and projecting axially from the peripheral flange 11 and the flange 13 of the packing cup at the non-pressure side thereof. The outer circumference of the spacer or series of interspaced spacers is of a diameter less than that of the outer circumference of the peripheral flange 11 at the non-pressure end thereof. The spaces 22 between the protuberances 21 are in direct communication with one another.

In Fig. 5 there is shown a single, annular, axially resilient spacer 23 fitting the cylindrical bottom 19 of the recess in the piston 4 and filling only part (about half) of the radial extension of the recess, thus leaving a continuous space or annular groove 24. Instead of being made as a separate ring also the continuous spacer 23 may be moulded integrally with the packing. In any case, preferably a somewhat harder synthetic rubber composition is used for the resilient spacer or spacers than for the rest of the packing. The space (24, Fig. 5) or spaces (22, Figs. 2 and 3), being intended to be filled up with grease, will be slightly reduced in volume during application of the brakes due to axial yielding of the resilient cushion 21 or 23 to the fluid pressure on the pressure face of the piston packing trying to force the peripheral portion thereof towards the end wall 20 of the recess in the piston 4, whereby a small quantity of lubricant will be forced out of the space or spaces 24 or 22, respectively. At the release of the brakes, the said space or spaces will expand again, which results in a sucking action recollecting the surplus of lubricant into the space or spaces 24 or 22 or into the grease groove 15, if provided in the packing actually used.

While illustrative embodiments of the inventive idea have been described herein in detail, it will be understood that the scope of the invention is not limited to such embodiments, or otherwise than by the terms of the appended claims.

What I claim and desire to secure by Letters Patent is:

1. In combination, a cylinder, a piston operating in said cylinder and having a pressure side and a non-pressure side, a packing for said piston, being of elastic, resilient material and comprising an annular portion engaging said piston for retaining said packing on said piston, a peripheral flange forming a sealing lip in contact with the wall of said cylinder, and a portion extending substantially in a plane at right angles to the axis of said cylinder and piston and joining said peripheral flange and said annular retaining portion of said packing, and a resilient cushion yieldingly backing up said peripheral flange and said joining portion of said packing axially at the non-pressure side thereof and disposed in spaced relation to the wall of said cylinder in a circumferential recess provided in said piston and occupied only partially by said cushion and intended to be filled up for the rest with cylinder wall lubricant for obtaining extrusion of such lubricant from and suction of such lubricant into said recess along the wall of said cylinder at the non-pressure side of said piston on axial yielding and expansion, respectively, of said cushion in said recess.

2. The combination claimed in claim 1, and said cushion consisting of a plurality of peripherally interspaced resilient spacers extending axially in said recess from the non-pressure side of said peripheral flange and said joining portion of said packing to a remote end wall of said recess.

3. The combination claimed in claim 2, and said spacers consisting of protuberances projecting axially from and moulded integrally with said peripheral flange and said joining portion of said packing.

4. The combination claimed in claim 1, the bottom of said recess in said piston being cylindrical and said cushion consisting of a cylindrical axially resilient ring fitting the cylindrical bottom of said recess and having a radial thickness of about half the radial distance between the cylindrical bottom of said recess and the wall of said cylinder.

5. The combination claimed in claim 4, and said substantially cylindrical ring being moulded integrally with said peripheral flange and said joining portion of said packing.

6. A piston packing having a pressure side and a non-pressure side and comprising a central portion for securing said packing in place on the piston, a peripheral flange forming a sealing lip, an intermediate portion extending substantially in a plane at right angles to the axis of said packing and joining said central portion and said peripheral flange adjacent the non-pressure end of the latter, and means forming on the non-pressure side of said packing an axial extension thereof projecting from said peripheral flange and said intermediate portion and constituting a resilient cushion for yieldingly supporting said peripheral flange and said intermediate portion of said packing axially from the piston when in place thereon, and said resilient cushion only partly filling a ring space defined by the inner circumference of said extension and a cylindrical surface of a diameter equal to that of said peripheral flange at the non-pressure end thereof.

7. A piston packing as claimed in claim 6, and said extension consisting of peripherally interspaced protuberances moulded integrally with and projecting axially from said peripheral flange and said joining intermediate portion of said packing at the non-pressure side thereof.

8. A piston packing as claimed in claim 6, and said extension being in the shape of a substantially cylindrical ring moulded integrally with and projecting axially from said peripheral flange and said joining intermediate portion of said packing at the non-pressure side thereof and having an outer diameter less than that of said peripheral flange at the non-pressure end thereof.

9. A piston packing as claimed in claim 6, and said packing including said axial extension being moulded in one piece from compositions of synthetic rubber of different softness in said extension and in the rest of said packing, the composition in said extension being somewhat harder than the composition in the rest of said packing.

References Cited in the file of this patent
UNITED STATES PATENTS

| | | |
|---|---|---|
| 2,055,104 | Hewitt et al. | Sept. 22, 1936 |
| 2,077,906 | Stevens | Apr. 20, 1937 |
| 2,428,452 | Farmer | Oct. 7, 1947 |